(12) United States Patent  
Del Paggio et al.

(10) Patent No.: US 9,657,232 B2  
(45) Date of Patent: May 23, 2017

(54) PROCESS FOR PRODUCING HYDROCARBONS

(71) Applicant: SHELL OIL COMPANY, Houston, TX (US)

(72) Inventors: Alan Anthony Del Paggio, Spring, TX (US); Michael John Roberts, Itasca, IL (US); Terry Louise Marker, Palos Heights, IL (US); Larry Gordon Felix, Pelham, AL (US); Martin Brendan Linck, Grayslake, IL (US)

(73) Assignee: SHELL OIL COMPANY, Houston, TX (US)

( * ) Notice: Subject to any disclaimer, the term of this patent is extended or adjusted under 35 U.S.C. 154(b) by 333 days.

(21) Appl. No.: 14/356,781

(22) PCT Filed: Nov. 12, 2012

(86) PCT No.: PCT/US2012/064619  
§ 371 (c)(1),  
(2) Date: May 7, 2014

(87) PCT Pub. No.: WO2013/074434  
PCT Pub. Date: May 23, 2013

(65) Prior Publication Data  
US 2015/0133704 A1     May 14, 2015

Related U.S. Application Data

(60) Provisional application No. 61/559,248, filed on Nov. 14, 2011.

(51) Int. Cl.  
*C10G 1/00* (2006.01)  
*C10K 1/02* (2006.01)  
(Continued)

(52) U.S. Cl.  
CPC ............ *C10G 1/002* (2013.01); *B01J 23/755* (2013.01); *B01J 23/882* (2013.01); *B01J 23/883* (2013.01);  
(Continued)

(58) Field of Classification Search  
CPC .... C07C 1/00; C10G 1/06; C10G 1/08; C10G 1/10  
(Continued)

(56) References Cited

U.S. PATENT DOCUMENTS 3,704,108 A   11/1972   Alpert  
3,882,167 A   5/1975   Lohmar et al.  
(Continued)

FOREIGN PATENT DOCUMENTS

| CN | 201864693 | 6/2011 |
| WO | 2011060556 | 5/2011 |
| WO | 2012145123 | 10/2012 |

OTHER PUBLICATIONS

Kunii, D. et al., "Fluidization Engineering" 2nd Ed., p. 80; 1991.  
(Continued)

*Primary Examiner* — Thuan D Dang

(57) ABSTRACT

A process for converting biomass to products is described. Biomass is contacted with hydrogen in the presence of a fluidized bed of hydropyrolysis catalyst in a reactor vessel under hydropyrolysis conditions; and products and char are removed from the reactor vessel. The products leave the fluidized bed at an exit bed velocity, the char has a settling velocity that is less than the exit bed velocity and hydropyrolysis catalyst has a settling velocity that is greater than the exit bed velocity.

8 Claims, 1 Drawing Sheet

(51) Int. Cl.

| | | |
|---|---|---|
| *C10B 49/10* | (2006.01) | |
| *C10B 53/02* | (2006.01) | |
| *C10B 57/06* | (2006.01) | |
| *B01J 37/20* | (2006.01) | |
| *B01J 23/755* | (2006.01) | |
| *B01J 23/882* | (2006.01) | |
| *B01J 23/883* | (2006.01) | |
| *B01J 35/00* | (2006.01) | |
| *B01J 35/02* | (2006.01) | |
| *B01J 37/02* | (2006.01) | |
| *C10G 1/08* | (2006.01) | |
| *C10G 3/00* | (2006.01) | |
| *C10G 1/06* | (2006.01) | |
| *C10L 1/02* | (2006.01) | |

(52) U.S. Cl.
CPC ......... *B01J 35/0026* (2013.01); *B01J 35/026* (2013.01); *B01J 37/0201* (2013.01); *B01J 37/20* (2013.01); *C10B 49/10* (2013.01); *C10B 53/02* (2013.01); *C10B 57/06* (2013.01); *C10G 1/008* (2013.01); *C10G 1/06* (2013.01); *C10G 1/08* (2013.01); *C10G 3/50* (2013.01); *C10K 1/024* (2013.01); *C10L 1/023* (2013.01); *C10L 1/026* (2013.01); *C10L 2200/0469* (2013.01); *C10L 2270/023* (2013.01); *C10L 2270/026* (2013.01); *C10L 2270/04* (2013.01); *C10L 2290/02* (2013.01); *Y02E 50/13* (2013.01); *Y02E 50/14* (2013.01); *Y02E 50/32* (2013.01); *Y02P 20/145* (2015.11); *Y02P 30/20* (2015.11)

(58) Field of Classification Search
USPC .................................................. 585/240–242
See application file for complete search history.

(56) References Cited

U.S. PATENT DOCUMENTS

| | | | |
|---|---|---|---|
| 4,298,453 | A | 11/1981 | Schoennagel et al. |
| 4,682,986 | A | 7/1987 | Lee et al. |
| 5,175,943 | A * | 1/1993 | Eastham .................. B01J 3/02 110/106 |
| 8,383,871 | B1 * | 2/2013 | Sellars ...................... C10L 3/08 208/67 |
| 2010/0251600 | A1 | 10/2010 | Marker et al. |
| 2010/0251615 | A1 | 10/2010 | Marker et al. |
| 2010/0256428 | A1 * | 10/2010 | Marker .................... C01B 3/16 585/240 |
| 2011/0042277 | A1 | 2/2011 | Briens et al. |

OTHER PUBLICATIONS

Li, Wen, et. al.,: Thermogravimetric Research in Pyrolysis, Journal of Fuel Chemistry and Technology Vo. 24, pp. 341-347, 1986.

* cited by examiner

PROCESS FOR PRODUCING HYDROCARBONS

PRIORITY CLAIM

The present application is the National Stage (§371) of International Application No. PCT/US2012/064619, filed Nov. 12, 2012, which claims priority from U.S. provisional application No. 61/559,248, filed Nov. 14, 2011, the disclosures of which are incorporated herein by reference.

FIELD OF INVENTION

The invention relates to a process for producing hydrocarbons from biomass by contacting the biomass with a hydropyrolysis catalyst. The invention further relates to an improved separation between the catalyst and solids produced in the process.

BACKGROUND

There is considerable interest in finding ways to convert biomass into valuable products, especially products that can be used as transportation fuels or in other chemical processes.

US Patent Application Publication No. 2010/0251600, which is herein incorporated by reference, describes a multi-stage process for producing liquid products from biomass in which the biomass is hydropyrolyzed in a reactor vessel containing molecular hydrogen and a deoxygenating catalyst, producing a partially deoxygenated pyrolysis liquid, char, and first stage process heat. The partially deoxygenated pyrolysis liquid is hydrogenated using a hydroconversion catalyst, producing a substantially fully deoxygenated pyrolysis liquid, a gaseous mixture comprising carbon monoxide and light hydrocarbon gases ($C_1$-$C_4$), and second stage process heat. The gaseous mixture is then reformed in a steam reformer, producing reformed molecular hydrogen. The reformed molecular hydrogen is then introduced into the reactor vessel for the hydropyrolysis of additional biomass.

Continued improvements in this type of process are needed so that it will be economically and technically feasible and able to be carried out on a commercial scale.

SUMMARY OF THE INVENTION

This invention provides a process for converting biomass to products comprising: contacting the biomass with hydrogen in the presence of a fluidized bed of hydropyrolysis catalyst in a reactor vessel under hydropyrolysis conditions; and removing products and char from the reactor vessel wherein the products leave the fluidized bed at an exit bed velocity, the char has a settling velocity that is less than the exit bed velocity and hydropyrolysis catalyst has a settling velocity that is greater than the exit bed velocity.

This invention provides a process for converting biomass to products comprising: contacting the biomass with hydrogen in the presence of a fluidized bed of fresh hydropyrolysis catalyst in a reactor vessel under hydropyrolysis conditions; removing products and char from the reactor vessel; carrying out the contacting and removing steps for a period of time such that the fresh hydropyrolysis catalyst attrits in the fluidized bed to form small catalyst particles; and removing at least a portion of the small catalyst particles with the products and char wherein the products leave the fluidized bed at an exit bed velocity, the char has a settling velocity that is less than the exit bed velocity, the fresh hydropyrolysis catalyst has a settling velocity that is greater than the exit bed velocity, and the small catalyst particles have a settling velocity that is less than the exit bed velocity.

DETAILED DESCRIPTION

Figure 1:
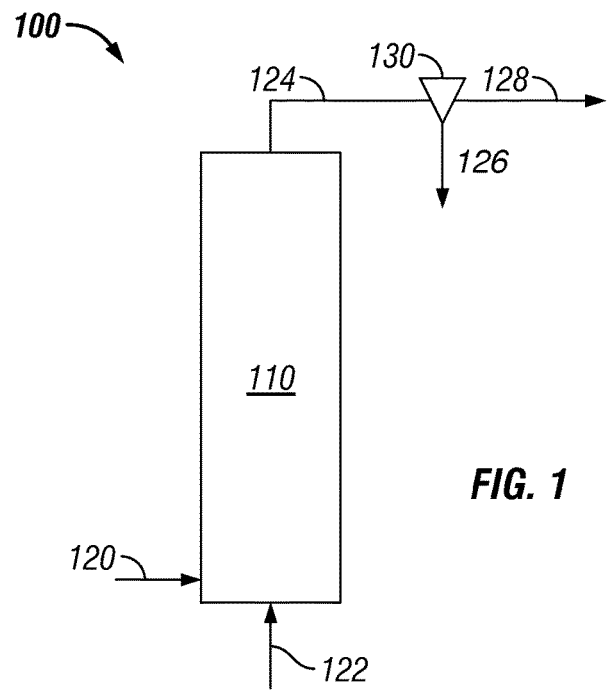
FIG. 1 depicts the process flow of the hydropyrolysis process.

This process is used to convert biomass into liquid products that may meet the specifications for gasoline, diesel fuel, jet fuel and/or other valuable liquid hydrocarbon products. Biomass feeds for the hydropyrolysis reactor may include a wide variety of biologically-derived materials, including everything from fat from rendering plants to dried chicken litter. Mixtures of materials from municipal solid waste dumps, for example, plastics, paper, cardboard, yard waste, food residue, etc., may be fed to the hydropyrolysis reactor. It is presumed that any material which breaks down, upon heating, into oxygenated hydrocarbons and/or non-oxygenated hydrocarbons with boiling points in the gasoline, diesel, or kerosene range could potentially be used as feedstock. Preferred biomass feedstocks include lignin, wood and algae. Algae may include whole algae and algal residues, for example, residues derived after any extractive procedures to remove lipids, proteins and/or carbohydrates. The biomass feed is typically prepared for use in the reaction by sizing and drying. The selection of biomass and the feed treatment process play a large role in the characteristics of the char formed in the reaction.

The other feed to the process is hydrogen. The hydrogen may be imported for use in the process or produced in a steam reformer. The steam reformer may be fed light hydrocarbons ($C_1$-$C_4$) and carbon monoxide produced in the hydropyrolysis process.

The hydropyrolysis reaction is carried out under suitable hydropyrolysis conditions that provide for the production of a partially deoxygenated pyrolysis liquid, char, light hydrocarbons ($C_1$-$C_4$) and carbon monoxide. The temperature of the reaction may be in the range of from about 300° C. to about 600° C., preferably in the range of from about 350° C. to about 540° C. and more preferably in the range of from about 399° C. to about 450° C. The pressure of the reaction may be in the range of from about 1.38 MPa to about 6.00 MPa, preferably in the range of from about 1.72 MPa to about 5.50 MPa, more preferably in the range of from about 2.06 MPa to about 5.00 MPa and most preferably in the range of from about 2.76 MPa to about 4.14 MPa.

The hydropyrolysis catalyst in the reactor is in the form of a fluidized bed. The velocity of the feed and products upward through the bed is sufficient to maintain the catalyst in a fluidized state. Most of the products are in a gaseous form under the hydropyrolysis reaction conditions and therefore pass in an upward direction through the bed. They pass through the upper portion of the bed and exit the catalyst bed. The velocity at which the gaseous products exit the catalyst bed is referred to herein as the exit bed velocity. The exit bed velocity will be a result of the feed rate, reaction rate, reactor pressure and temperature and reactor dimensions.

In order to maintain the upper portion of the catalyst bed in the reactor, the exit bed velocity must not be so high that the vapor entrains catalyst particles and carries them overhead with the products. The tendency of the catalyst or other solids formed in the reactor to be entrained with the vapor is determined by the settling velocity of the individual particles.

The settling velocity of a particle is the terminal velocity a particle reaches when traveling in a fluid and is achieved when the drag force of the fluid on the particle is equal and opposite to the force of gravity on the particle. The settling velocity of a particle is a function of the density of the particle, the diameter of the particle, the fluid (gas) density and gravitational acceleration. See Kunii, Daizo and Octave Levenspiel, *Fluidization Engineering*. $2^{nd}$ ed. (Butterworth-Heinemann 1991), p. 80, which is herein incorporated by reference. The shape and other factors are incorporated into an experimentally determined dimensionless drag coefficient.

In a fluidized bed, the settling velocity of the individual particles and the gas velocity in the bed can be combined to arrive at a net particle velocity, i.e., the gas velocity in the bed minus the settling velocity of the particle will be the net velocity of the particle. For example, a char particle with a net upward velocity will be carried out of the bed and entrained with the gaseous products because the gas velocity is greater than the settling velocity of the char particles. On the other hand, a catalyst particle will have a net negative (downward) velocity when the settling velocity of the catalyst particle is greater than the gas velocity in the bed, and the catalyst particle will tend to remain in the catalyst bed.

In this process, it is preferred for the majority of the catalyst to remain in the fluidized catalyst bed and for the majority of the char to be entrained with the gaseous products and carried out of the reaction. It is important to keep as much catalyst as possible in the fluidized bed to maintain the reaction activity and prevent contamination of the char by the metals on the catalyst.

The exit bed velocity is a function of the process conditions and the reactor configuration. Specifically, the exit bed velocity can be calculated as the volumetric flow rate of gaseous products exiting the bed divided by the cross sectional area of the reactor at the top of the fluidized catalyst bed. It is preferred for the settling velocity of the catalyst to be at least 1.5 times the settling velocity of the char to achieve an effective separation between the char and catalyst, but the main factor in carrying out this separation is the exit bed velocity.

The hydropyrolysis catalyst can be any catalyst known to one of ordinary skill in the art to be useful in this reaction. A suitable catalyst for use in this process has certain physical characteristics that affect its performance in the fluidized bed hydropyrolysis reactor. In this process, the settling velocity of the catalyst determines whether the catalyst will remain in the fluidized bed or be eluted from the reactor and carried out with the gaseous products. If the settling velocity of the catalyst is greater than the exit bed velocity then the catalyst will remain in the fluidized bed and not be entrained with the gaseous products.

The settling velocity of the catalyst may be any velocity greater than the exit bed velocity, preferably greater than 110% of the exit bed velocity, more preferably greater than 125% of the exit bed velocity and most preferably greater than 150% of the exit bed velocity.

Suitable hydropyrolysis catalysts include supported and bulk catalysts. A suitable catalyst for this is a sulfided CoMo or NiMo catalyst impregnated on a spherical alumina support. These catalysts are placed on spherical supports to minimize attrition for use in a fluid bed reactor. Another suitable catalyst is a nickel aluminate or nickel catalyst impregnated on a spherical alumina support. In all cases the catalyst must have enough activity to add hydrogen to the structure and minimize coking reactions.

It is possible that in addition to these catalysts, other catalysts might work as well. Glass-ceramic catalysts can be extremely strong and attrition resistant and can be prepared as thermally impregnated or as bulk catalysts. When employed as a sulfided NiMo, Ni/NiO, or Co based glass-ceramic catalyst, the resulting catalyst is an attrition resistant version of a readily available, but soft, conventional NiMo, Ni/NiO, or Co based catalyst. Glass-ceramic sulfided NiMo, Ni/NiO, or Co based catalysts are particularly suitable for use in a hot fluidized bed because these materials can provide the catalytic effect of a conventional supported catalyst, but in a much more robust, attrition resistant form. In addition, due to the attrition resistance of the catalyst, the biomass and char are simultaneously ground into smaller particles as the hydropyrolysis reactions proceed within the hydropyrolysis reactor.

During the process, char is produced. Char is the solid biomass residue remaining after the hydropyrolysis reaction. The char is preferably entrained with the gaseous products and carried out of the reactor. The physical characteristics of the char determine whether it will be entrained with the gaseous products. Specifically, if the settling velocity of the char is less than the exit bed velocity then the char will be entrained with the gaseous products and carried out of the reactor. The char will not necessarily be uniform as its characteristics are determined by the type of biomass, the biomass pretreatment steps, and the hydropyrolysis reaction conditions. Further, the char may be reduced in size by the vigorous mixing in the fluidized bed.

The settling velocity of the char may be any velocity less than the exit bed velocity, preferably less than 90% of the exit bed velocity, more preferably less than 75% of the exit bed velocity and most preferably less than 60% of the exit bed velocity. It is understood that the individual char particles formed in the reactor may have an initial settling velocity greater than the exit bed velocity, but that over time, the settling velocity of the char particles may be reduced by contact with the catalyst and other char particles until the settling velocity of the char particles is less than the exit bed velocity.

The settling velocity of the catalyst after it has been in the fluidized bed reactor will decrease over time as the catalyst attrits due to the vigorous mixing in the fluidized bed. As the average settling velocity of the catalyst particles decreases, it will reach a point where the settling velocity of the attritted catalyst or the small catalyst particles that are broken off of the catalyst will be less than the exit bed velocity and the attritted catalyst or small catalyst particles will be entrained and carried over with the gaseous products. A suitable catalyst is preferably attrition resistant so this process of attrition of the catalyst will happen very slowly.

The gaseous products will contain solid particles, such as char and catalyst particles which are entrained with the gaseous products. These solid particles must be removed from the gaseous products before the gaseous products are further processed, and it is preferred for the char to be separated from the catalyst particles. This separation can be carried out by any suitable method including filters, cyclones, or other centrifugal or centripetal separators.

In one embodiment, the gaseous products are passed through a cyclone to remove the char and then through a filter to remove the catalyst fines. Char may be removed by cyclone from the gaseous products stream or by way of coarse filtering. If the char is separated by hot gas filtration, then the dust cake caught on the filters will have to be periodically removed. It will be easier to remove because the hydrogen produced in the hydropyrolysis reaction will have stabilized the free radicals and saturated the olefins produced in the reaction. In conventional fast pyrolysis, the removal of this dust cake is much more difficult because the char tends to coat the filter and react with oxygenated pyrolysis vapors to form viscous coatings.

In an embodiment, a cyclone is first used to collect char fines from the process vapors leaving the fluidized bed, and a porous filter is then used to collect catalyst particles (which have a greater particle density, but a much smaller diameter than the char). Further, two porous filters may be used in parallel, so that one may be cleaned via backpulsing while the other is online.

Electrostatic precipitation or a virtual impactor separator may also be used to remove char and ash particles from the hot gaseous products stream before cooling and condensation of the pyrolysis liquid.

In another embodiment, the char may be removed by bubbling the gaseous products stream through a recirculating liquid that is preferably the high boiling point portion of the finished oil from the process. Char and catalyst fines may be captured in this liquid, which can then be filtered to remove the char and catalyst particles and/or recirculated to the hydropyrolysis reactor.

In another embodiment, large size NiMo or CoMo catalysts, deployed in an ebullated bed, are used for char removal and to provide further deoxygenation simultaneous with the removal of fine particulates. These catalyst particles are large, preferably from ⅛ to 1/16 inch in size so they are easily separable from the fine char carried over from the hydropyrolysis reaction.

After removal of the char, the partially deoxygenated pyrolysis liquid, together with hydrogen, carbon monoxide, carbon dioxide, water and light hydrocarbon gases ($C_1$-$C_4$) from the hydropyrolysis reaction may be fed to a hydroconversion reactor or another type of reaction zone that is used to further process the pyrolysis liquid. In a preferred embodiment, the hydroconversion reactor is operated at a lower temperature than the hydropyrolysis reaction, in the range of from about 315° C. to about 425° C. and at about the same pressure. The liquid hourly space velocity of this step is in the range of from about 0.3 to about 2.0. The catalyst used in this reactor should be protected from catalyst poisons, such as sodium, potassium, calcium, phosphorous and other metals that may be present in the biomass. The catalyst will be protected from olefins and free radicals by the catalytic upgrading carried out in the hydropyrolysis reactor. Catalysts typically selected for this step are high activity hydroconversion catalysts, for example, sulfided NiMo and sulfided CoMo catalysts. In this reaction stage, the catalyst is used to catalyze a water-gas shift reaction of $CO+H_2O$ to make $CO_2+H_2$, thereby enabling in-situ production of hydrogen in the hydroconversion reactor.

Following the hydroconversion step, the liquid products will be almost completely deoxygenated. These products can be used as a transportation fuel after separation by means of high pressure separators and a low pressure separator by distillation into gasoline and diesel portions. The gases exiting the hydroconversion step are mainly carbon monoxide, carbon dioxide, methane, ethane, propane, and butanes that can be sent to an optional steam reformer together with water to form hydrogen to be used in the process. A portion of these gases may also be burned to produce heat needed for the steam reformer step.

An embodiment of the hydropyrolysis reaction system 100 will be described with respect to FIG. 1. A hydropyrolysis reaction system 100 comprises a hydropyrolysis reactor 110 that contains a bed of fluidized catalyst. Biomass is fed into the reactor through biomass feed line 120 and hydrogen is fed into the reactor by hydrogen feed line 122. The hydrogen and biomass react in the presence of the catalyst and the products, including pyrolysis liquids, light gases, carbon monoxide and char are carried out of the reactor via product line 124. The products are passed through a cyclone 130 where the char is separated out via line 126 and the products are removed via line 128. Other embodiments include the use of a filter and/or other means for separating the solids from the product. Small catalyst particles may also be carried out of the reactor via line 124 and these would be separated from the products, either with the char or separately.

Figure 2:
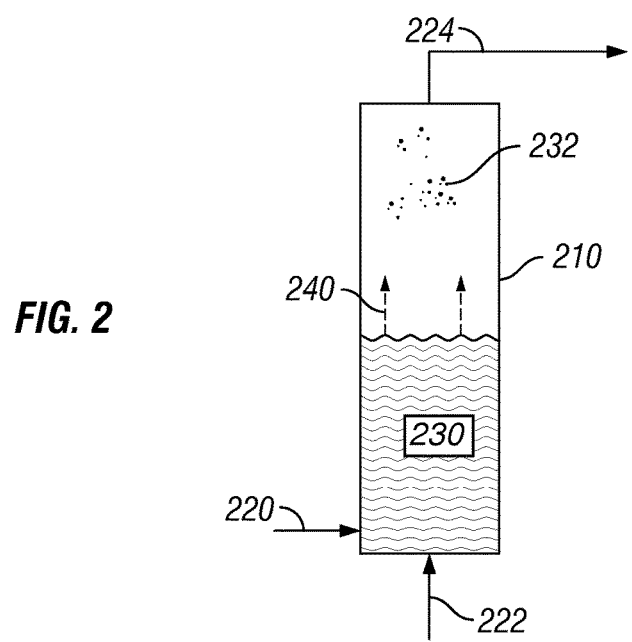
FIG. 2 depicts the inside of the reactor vessel during operation.

An embodiment of the hydropyrolysis reaction will be described with respect to FIG. 2. A hydropyrolysis reactor 210 contains a fluidized bed of hydropyrolysis catalyst 230. The biomass is fed through line 220 and the hydrogen is fed through line 222. The arrows 240 depict the exit bed velocity of the gases leaving the top of the catalyst bed. The particles 232 are either solid char particles or small catalyst particles that are entrained with the gaseous product stream that is removed via line 224.

EXAMPLES

A hydropyrolysis reactor was operated under conditions consistent with those described above, in order to demonstrate removal of biomass char and attrited catalyst particles from a catalyst bed via entrainment. The hydropyrolysis reactor consisted of a tubular vessel, with an interior diameter of 1.28 inches. A catalyst bed was disposed within the reactor. Hydrogen, at a temperature of approximately 371° C., was fed into the bottom of the bed of catalyst in order to fluidize it. Prior to loading, the catalyst particles were sieved, so that each particle was small enough to pass through a sieve with a screen opening of 500 microns, but large enough to be retained on a sieve with a screen opening of 300 microns. The reactor was operated at 2.41 MPa and thermocouples, disposed within the fluidized bed, indicated that the average temperature of the bed was approximately 404° C. This bed temperature was maintained and controlled by electric heaters. The flow rate of hydrogen into the bottom of the bed was such that the exit velocity of vapors leaving the bed (exit bed velocity) was 0.13 meter/second. A heated filter assembly was disposed downstream of the fluidized-bed hydropyrolysis reactor, and was used to trap any particles, consisting of either char or attrited catalyst, that left the fluidized bed during the experiment. The filter was maintained at a temperature high enough to prevent any of the vapors from condensing to form liquids in the filter assembly.

Initially, 200 grams of fresh, sulfided catalyst were disposed within the hydropyrolysis reactor. It was established that the exit bed velocity of 0.13 meter/second was too low to remove any measurable quantity of intact catalyst particles from the bed. The settling velocity of all the intact catalyst particles in the bed was thus found to be larger than the exit velocity of vapors from the bed. It should be noted that the catalyst particles were not spherical when they were loaded, and that the settling velocity of individual particles was not determined directly. It was established that the particles were small enough to be vigorously fluidized and effectively mixed by the stream of fluidizing gas, but also large enough to be retained, without being carried out by the stream of process vapors leaving the bed. No further characterization of the aerodynamic properties of the catalyst was conducted.

The reactor was then fed a feedstock consisting of powdered hardwood. The feedstock had a maximum particle size small enough to pass through a screen with an opening of 250 microns. The feedstock was effectively cooled and transported in such a manner that individual feedstock particles could not interact with each other, and could not heat up significantly, during transport into the fluidized bed. Once the feedstock particles arrived in the bed, they were heated very rapidly to the temperature of the bed, via interaction with hot hydrogen, process vapors and catalyst particles present in the bed. Each feedstock particle was rapidly devolatilized, and the resulting vapors then had the opportunity to react with hydrogen present in the reactor. These reactions were facilitated by the presence of the catalyst particles. Once the feedstock particles were devolatilized, only a char particle, consisting largely of carbon from the original feedstock, remained behind. These char particles were significantly smaller in size than the catalyst particles in the bed, and also had a lower particle density. As a result, these char particles were carried rapidly to the top of the fluidized bed, and were then conveyed out of the hydropyrolysis reactor, and into the heated filter assembly downstream of the reactor.

The system was operated over a period of three days. 2100 grams of feedstock were loaded into the system the first day; 2100 grams of feedstock were again loaded into the system on the second day, and 1800 grams of feedstock were loaded into the system on the third day. After the system was shut down, 15 grams of unprocessed feedstock were recovered. Thus, 5985 grams of feedstock were processed in the hydropyrolysis reactor.

As described above, 200 grams of fresh catalyst were initially loaded into the reactor. On the second day of the experiment, 17 grams of fresh catalyst were sent into the reactor, in order to replace any catalyst that had been removed via attrition after the first day of processing. On the third day, 17 grams of fresh catalyst were again loaded into the reactor. When the system was shut down and unloaded, the weight of the bed was 228 grams. The bed consisted mostly of catalyst, but also contained some carbonaceous char material.

Since solids were recovered from the reactor and the filter assembly, an analysis of the solids was used to confirm that the preponderance of the catalyst had been left in the fluidized bed in the hydropyrolysis reactor, and had not been carried out into the filter assembly. Further, the analysis confirmed that the preponderance of the biomass char particles had been removed from the fluidized bed in the reactor, and carried over into the filter assembly. The catalyst contained no detectible quantities of carbon when initially loaded into the reactor. When recovered, the bed contained 22.5% carbon, meaning that 51 grams of carbon remained in the bed. This carbon originated in the feedstock.

The filter fines weighed 573 grams, and were 78.7% carbon. This means 451 grams of carbon were recovered from the char fines in the filter. Sizing of the particles in the filter and the bed confirmed that the particles of the fines from the filter assembly were in a much lower range than particles left behind in the hydropyrolysis reactor.

Effectively, 90% of the char produced during operation of the reactor was rapidly carried out of the fluidized bed, and accumulated in the filter assembly. The proportion of char left behind in the reactor was related to the largest of the biomass particles present in the feedstock. These particles would eventually have been carried over to the filter assembly, if the fluidization in the bed had been maintained for an extended period after cessation of feedstock addition to the bed. However, the experiment was terminated immediately after the feedstock was used up, and there was no opportunity to reduce the remaining char in size to a point where it would have been carried over to the filter assembly.

The process vapors from the hydropyrolysis reactor were sent on to a second-stage reactor after they passed through the filter assembly. In the second-stage reactor, the process vapors were contacted with a fixed bed of catalyst, and further hydrotreating occurred. After the experiment was over, the products were analyzed. On a moisture and ash-free basis, 26.7% of the mass of feedstock sent into the reactor was accounted for as gasoline-range and diesel-range hydrocarbons. The oxygen content of the liquid hydrocarbon products was less than 1% by mass.

The bulk density of the char, collected in the filter assembly, was also assessed, and was determined to be 0.3 g/cc. The bulk density of the catalyst in the fluidized bed was found to be 0.9 g/cc. This difference in the bulk densities of the char and the catalyst particles was partly responsible for the effective separation of the char from the bed, since particles of the lower-density char could be readily carried out of the bed, while particles of higher-density catalyst were retained.

That which is claimed is:

1. A process for converting biomass to products comprising:
   a. contacting the biomass with hydrogen in the presence of a fluidized bed of fresh hydropyrolysis catalyst in a reactor vessel under hydropyrolysis conditions;
   b. removing products and char from the reactor vessel;
   c. carrying out the contacting and removing steps for a period of time such that the fresh hydropyrolysis catalyst attrits in the fluidized bed to form small catalyst particles;
   d. removing at least a portion of the small catalyst particles with the products and char wherein the products leave the fluidized bed at an exit bed velocity, the char has a settling velocity that is less than the exit bed velocity, the fresh hydropyrolysis catalyst has a settling velocity that is greater than the exit bed velocity, and the small catalyst particles have a settling velocity that is less than the exit bed velocity;
   e. separating the products to remove the carbon monoxide and light hydrocarbons from the remainder of the products; and
   f. passing the remainder of the products to a hydroconversion reactor wherein the remainder of the products are contacted with a hydroconversion catalyst under suitable hydroconversion conditions to produce a condensable liquid hydrocarbon product that has less than 1% oxygen.

2. A process as claimed in claim 1 wherein the settling velocity of the char is less than 90% of the exit bed velocity.

3. A process as claimed in claim 1 wherein the settling velocity of the char is less than 75% of the exit bed velocity.

4. A process as claimed in claim 1 wherein the settling velocity of the hydropyrolysis catalyst is greater than 110% of the exit bed velocity.

5. A process as claimed in claim 1 wherein the settling velocity of the hydropyrolysis catalyst is greater than 150% of the exit bed velocity.

6. A process as claimed in claim 1 wherein the settling velocity of the small catalyst particles is less than 90% of the exit bed velocity.

7. A process as claimed in claim 1 wherein the settling velocity of the small catalyst particles is less than 75% of the exit bed velocity.

8. A process as claimed in claim 1 where the small catalyst particles are separated out by a filter while the char is separated by a cyclone.

* * * * *